US008191260B2

(12) United States Patent
Kato et al.

(10) Patent No.: US 8,191,260 B2
(45) Date of Patent: Jun. 5, 2012

(54) LIQUID EJECTION HEAD AND MANUFACTURING METHOD THEREOF

(75) Inventors: Maki Kato, Fuchu (JP); Masaki Ohsumi, Yokosuka (JP); Yoshinori Tagawa, Yokohama (JP); Kazuhiro Asai, Kawasaki (JP); Masahiko Kubota, Tokyo (JP); Tamaki Sato, Kawasaki (JP); Akihiko Okano, Kawasaki (JP)

(73) Assignee: Canon Kabushiki Kaisha Kaisha, Tokyo (JP)

( * ) Notice: Subject to any disclaimer, the term of this patent is extended or adjusted under 35 U.S.C. 154(b) by 567 days.

(21) Appl. No.: 12/400,440

(22) Filed: Mar. 9, 2009

(65) Prior Publication Data

US 2009/0229125 A1 Sep. 17, 2009

(30) Foreign Application Priority Data

Mar. 13, 2008 (JP) ................................ 2008-064139

(51) Int. Cl.
*B21D 53/76* (2006.01)
*B23P 17/00* (2006.01)
*B41J 2/135* (2006.01)

(52) U.S. Cl. ........................................ 29/890.1; 347/44

(58) Field of Classification Search ................. 29/890.1, 29/829; 347/20, 40, 44–45, 65
See application file for complete search history.

(56) References Cited

U.S. PATENT DOCUMENTS 4,657,631 A * 4/1987 Noguchi ......................... 216/27
4,775,445 A * 10/1988 Noguchi ......................... 216/27
5,478,606 A * 12/1995 Ohkuma et al. .............. 427/555
6,137,510 A * 10/2000 Sato et al. ........................ 347/63
6,315,853 B1 * 11/2001 Kubota et al. ................. 156/257
6,455,112 B1 * 9/2002 Ohkuma et al. .............. 427/504
6,464,345 B2 * 10/2002 Kubota et al. ................... 347/65
6,472,125 B1 * 10/2002 Koide et al. ................... 430/320
6,497,475 B1 * 12/2002 Kubota et al. ................... 347/65
6,533,400 B1 * 3/2003 Kudo et al. ...................... 347/63
6,663,229 B2 * 12/2003 Komuro et al. ................. 347/65
6,910,760 B2 * 6/2005 Kubota et al. ................... 347/56
6,960,424 B2 * 11/2005 Miyagawa et al. ........... 430/320
7,036,909 B2 * 5/2006 Kubota et al. ................... 347/47
7,070,912 B2 * 7/2006 Park et al. ..................... 430/320
7,282,243 B2 * 10/2007 Ohkuma et al. .............. 427/510
7,287,847 B2 * 10/2007 Fujii et al. ........................ 347/93
7,300,596 B2 * 11/2007 Murayama et al. ............. 216/27

(Continued)

FOREIGN PATENT DOCUMENTS

JP 3-10089 B2 2/1991

(Continued)

*Primary Examiner* — David Angwin
(74) *Attorney, Agent, or Firm* — Fitzpatrick, Cella, Harper & Scinto

(57) ABSTRACT

A manufacturing method of a liquid ejection head includes forming on a substrate a first flow passage wall forming member contacting a solid layer of equal height, exposing a first layer of a negative photosensitive resin material to form an ejection outlet forming member; exposing a second layer, on the first layer, of a negative photosensitive resin material to form a second flow passage wall forming member for forming another part of the wall of the flow passage; placing the exposed first and second layers on the solid layer and the first flow passage wall forming member so that a non-exposed portion of the second layer contacts the solid layer; forming parts of the flow passage and the ejection outlet by removing non-exposed portions of the first and second layers above the substrate; and forming the flow passage by removing the solid layer.

3 Claims, 5 Drawing Sheets

U.S. PATENT DOCUMENTS

| | | | | |
|---|---|---|---|---|
| 7,389,585 | B2 * | 6/2008 | Sato et al. | 29/890.1 |
| 7,485,412 | B2 * | 2/2009 | Okano et al. | 430/320 |
| 2003/0011655 | A1 * | 1/2003 | Miyagawa et al. | 347/20 |
| 2006/0114295 | A1 * | 6/2006 | Asai et al. | 347/65 |
| 2007/0099121 | A1 * | 5/2007 | Kubota et al. | 430/311 |
| 2007/0176990 | A1 * | 8/2007 | Urayama et al. | 347/93 |
| 2007/0178248 | A1 * | 8/2007 | Ohsumi et al. | 427/555 |
| 2007/0207414 | A1 * | 9/2007 | Murayama et al. | 430/311 |
| 2008/0227035 | A1 * | 9/2008 | Kanri et al. | 430/320 |
| 2009/0133256 | A1 * | 5/2009 | Okano et al. | 29/890.1 |
| 2009/0136875 | A1 * | 5/2009 | Kubota et al. | 430/320 |
| 2009/0162797 | A1 * | 6/2009 | Tsuji et al. | 430/320 |
| 2009/0167812 | A1 * | 7/2009 | Asai et al. | 347/20 |

FOREIGN PATENT DOCUMENTS

| | | |
|---|---|---|
| JP | 3143308 B2 | 12/2000 |

* cited by examiner

LIQUID EJECTION HEAD AND MANUFACTURING METHOD THEREOF

FIELD OF THE INVENTION AND RELATED ART

The present invention relates to a liquid ejection head for ejecting liquid and a manufacturing method of the liquid ejection head. Specifically, the present invention relates to an ink jet recording head for effecting recording by ejecting ink onto a recording material (medium) and a manufacturing method of the ink jet recording head.

As an example using the liquid ejection head for ejecting liquid, there is an ink jet recording head used in an ink jet recording method.

In an ink jet recording apparatus, image recording is effected by ejecting minute droplet-like ink from a plurality of ink ejection outlets arranged on an ink jet head.

A manufacturing method of the above-described liquid ejection head is disclosed in U.S. Pat. No. 4,657,631. In this manufacturing method, an ink jet head is manufactured through the steps of:

(1) forming, through patterning, a mold of an ink flow passage of a photosensitive material on a substrate on which a recording element is formed, (2) forming a coating resin material layer on the substrate by coating so as to coat the mold pattern, and then (3) removing the photosensitive material used for the mold after an ink ejection outlet communicating with the mold of the ink flow passage is formed on the coating resin material layer.

In the manufacturing method disclosed in U.S. Pat. No. 4,657,631, as the photosensitive material, a positive resist is used from the viewpoint of easiness of removal.

In the above-described manufacturing method, the ink flow passage, the ejection outlet, and the like are formed through lithography employed in semiconductor manufacturing, so that it is possible to perform fine processing with high accuracy. In this case, however, a change in shape in the neighborhood of the ink flow passage and the ejection outlet is basically restricted to a two-dimensional direction parallel to an element substrate. That is, the photosensitive material layer cannot be partially formed in a multiple layer because of use of the photosensitive material for the mold for the ink flow passage and the ejection outlet, so that the mold for the ink flow passage or the like cannot be changed in height (i.e., a shape of the mold with respect to a height direction of the element substrate is restricted to a uniform shape). As a result, ink flow passage design necessary to realize high-speed and stable ejection is restricted.

U.S. Patent Application Publication No. US2003/0011655 discloses a method for manufacturing an ink jet head having a three-dimensional liquid flow passage structure. In this manufacturing method, the ink jet head having the three-dimensional liquid flow passage structure is formed through the steps of:

(1) forming a first positive resist layer 7 on a substrate on which a heater is formed (FIG. 4(*a*)), (2) forming a second positive resist layer 8 on the first positive resist layer 7 (FIG. 4(*b*)), (3) forming a predetermined pattern by subjecting the upper second positive resist layer 8 to light exposure and development by using ionizing radiation in a wavelength range in which the second positive resist layer 7 causes decomposition reaction (FIG. 4(*c*)), (4) forming a predetermined pattern by subjecting the lower first positive resist layer 7 to light exposure (FIG. 4(*d*)) and development by using ionizing radiation in a wavelength range in which the first positive resist layer causes decomposition reaction (FIG. 4(*e*)), (5) coating a coating resin material layer 9 of a negative resist on the resist patterns of the first and second positive resist layers (FIG. 4(*f*)), (6) forming an ejection outlet pattern 10 on the coating resin material layer 9 (FIG. 4(*g*)), and then (7) dissolving and removing the first and second positive resist patterns 7 and 8 (FIG. 4(*h*)).

However, in order to suppress variations in an ejection amount, an ejection speed, and the like of small ink liquid droplets during advance of downsizing of a droplet size of ink with recent higher printing image quality, it is necessary to form bubble-generating chambers/ink flow passages with high accuracy. That is, with a smaller ink droplet, an ejection performance of the ink droplet depends on a dimension and a height of the bubble-generating chambers/ink flow passages, so that variations thereof can result in variations in ejection amount, ejection speed, and the like of the ink droplet.

For that reason, a processing method with higher accuracy is required but it has been difficult to achieve an objective bubble-generating chamber formation accuracy only by a conventional ink flow passage forming method.

As one of factors for causing the variation in shape dimension of the bubble-generating chambers, dissolution and deformation of the ink flow passage structure of the positive resist for providing the bubble-generating chambers by a solvent, gas, heat, and the like used in various steps can be considered.

For example, when the second positive resist is applied onto the first positive resist, solvents for these positive resists cause mutual dissolution or the second positive resist pattern causes a decrease in film thickness during development of the first positive resist.

In order to solve these problems, as a method of maintaining the shape dimension, the use of a positive resist having high resistance to the various steps can be considered. However, the positive resist is required to be removed after an ink flow passage wall is formed, so that the use of the positive resist having the high resistance can lead to a lowering in removal performance.

SUMMARY OF THE INVENTION

A principal object of the present invention is to provide a constitution of a highly reliable ink ejection outlet protecting film formed on a substrate.

Another object of the present invention is to provide a manufacturing method capable of facilitating provision of such a constitution.

According to an aspect of the present invention, there is provided a manufacturing method of a liquid ejection head including an ejection outlet forming member provided with an ejection outlet for ejecting liquid and including a flow passage communicating with the ejection outlet, the manufacturing method comprising:

preparing a substrate on which a first flow passage wall forming member for forming a part of a wall of the flow passage and a solid layer having a shape of a part of the flow passage contact each other, wherein the first flow passage wall forming member has a height, from a surface of the substrate, substantially equal to that of the solid layer;

providing a first layer formed of a negative photosensitive resin material;

exposing to light a portion of the first layer for constituting the ejection outlet forming member;

providing a second layer, on the first layer, formed of a negative photosensitive resin material;

exposing to light a portion of the second layer for constituting a second flow passage wall forming member for forming another part of the wall of the flow passage;

placing the exposed first layer and the exposed second layer on the solid layer and the first flow passage wall forming member so that a non-exposed portion of the second layer contacts the solid layer;

forming a part of the flow passage and the ejection outlet by removing a non-exposed portion of the first layer and the non-exposed portion of the second layer above the substrate; and forming the flow passage by removing the solid layer.

According to the present invention, a first bubble-generating chamber and a flow passage therefor are formed of a negative photosensitive resin material through lithography and a second bubble-generating chamber and a flow passage therefor are formed by transfer of the second bubble-generating chamber and the flow passage therefor onto a first flow passage wall and a soluble resin material layer, so that the resultant bubble-generating chambers and ink flow passages are excellent in shape stability.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
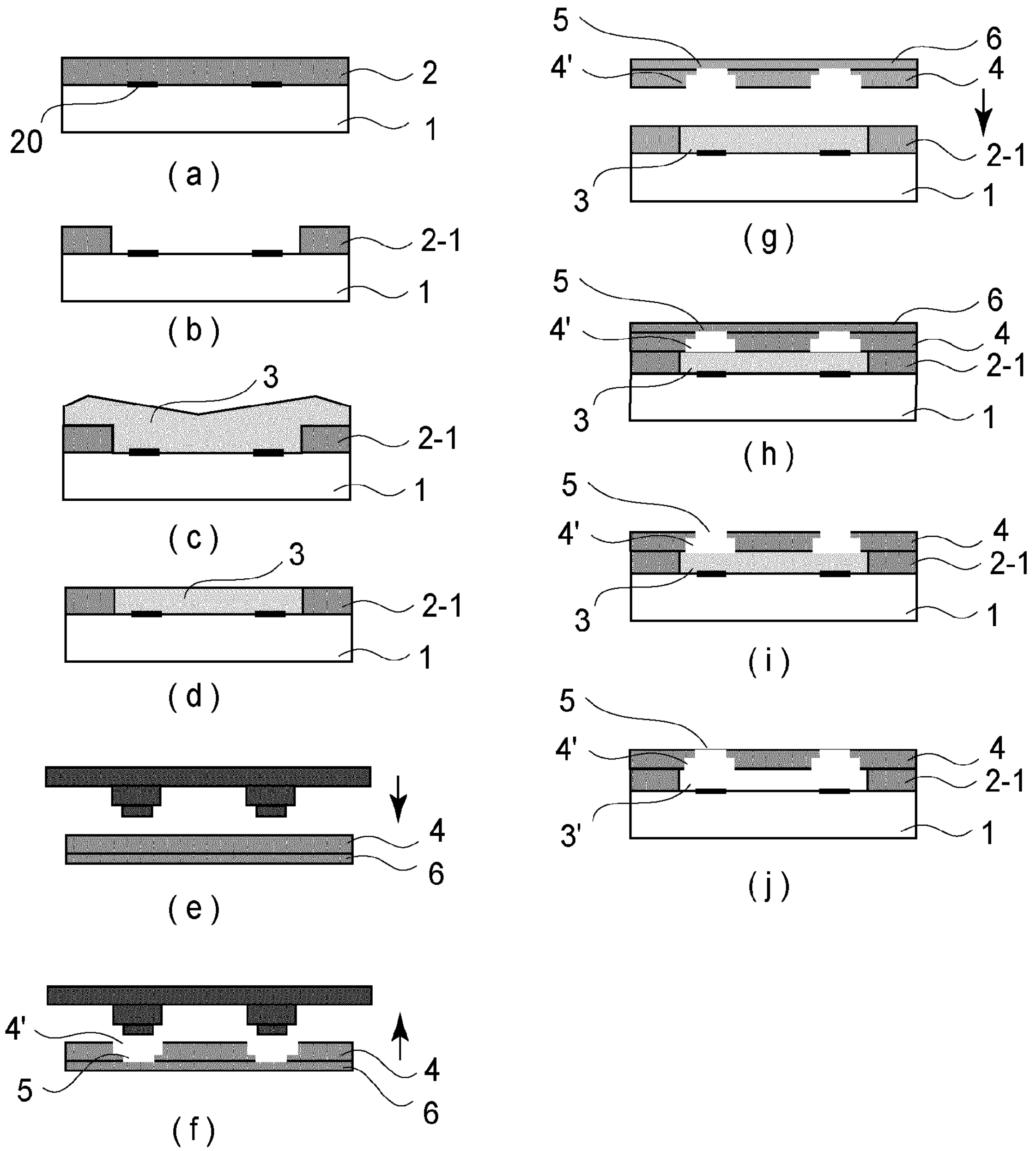
FIGS. 1(*a*) to 1(*j*) are schematic sectional views for illustrating an embodiment of the manufacturing method of a liquid ejection head according to the present invention.

Hereinbelow, embodiments of the manufacturing method of a liquid ejection head according to the present invention will be described.

In the following description, with reference to the figures, constituent members having the same function are represented by the same reference numerals or symbols and are omitted from redundant explanation in some cases.

In the following description, an ink jet recording method will be described as an applied embodiment of the present invention. However, the present invention is not limited thereto but may also be applicable to biochip preparation, electronic circuit printing, etc.

The liquid ejection head is mountable to a printer, a copying machine, a facsimile machine including a communication system, a device such as a word processor including a printer portion, and industrial recording devices compositively combined with various processing devices. For example, the liquid ejection head can also be used for biochip preparation, electronic circuit printing, ejection of medication in the form of spray, etc. For example, by using this liquid ejection head for the purpose of recording, it is possible to carry out recording on various recording media (materials) such as paper, thread, fiber, fabric, leather, metal, plastic, glass, wood, and ceramics. Herein, "recording" means not only that a significant image such as a character image or a graphical image is provided to the recording medium but also that an insignificant image such as a pattern image is provided to the recording medium.

Figure 5:
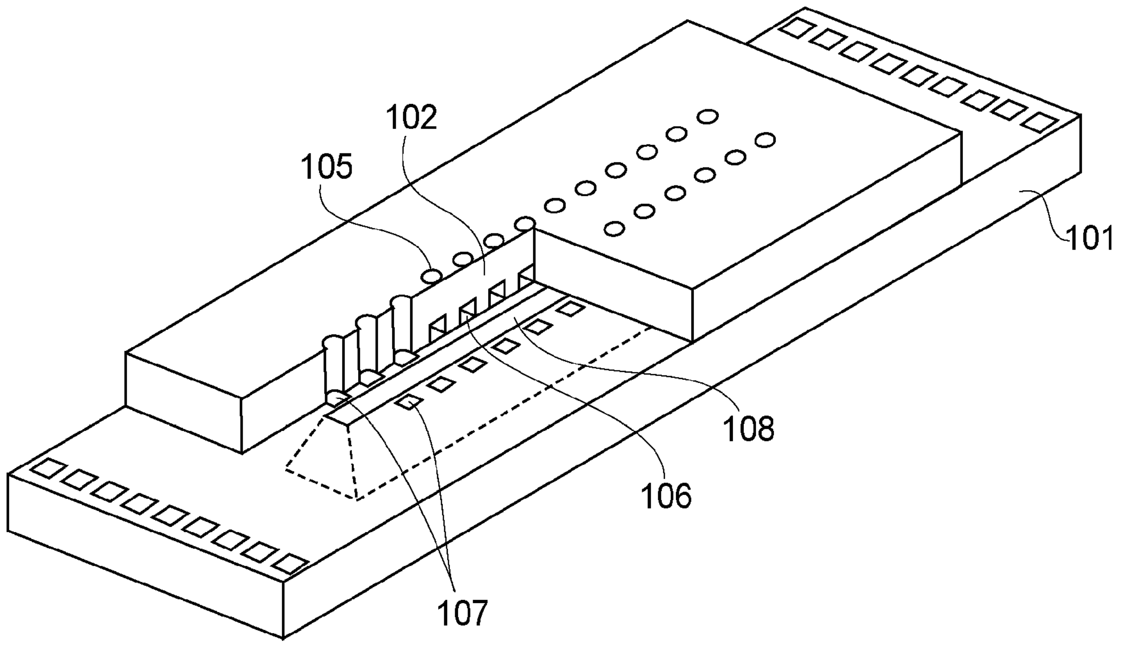
FIG. 5 is a schematic perspective view for illustrating a recording head used in the present invention.

FIG. 5 is a schematic perspective view showing a recording head (liquid ejection head) according to an embodiment of the present invention.

The recording head in this embodiment includes a substrate 101 of Si on which energy generating elements 107 for generating energy utilized for ejecting ink as recording liquid are formed and arranged with a predetermined pitch. The substrate 101 is provided with a supply port 108, formed by subjecting Si to anisotropic etching, which is opened between two arrays of the energy generating elements 107. On the substrate 101, ejection outlets 105 provided by a flow passage forming member 102 at positions opposite to the respective energy generating elements 107 and individual flow passages extending from the supply port 108 and communicating with associated ones of the ejection outlets 105. Incidentally, the positions of the ejection outlets 105 are not limited to those opposite to the energy generating elements 107.

In the case where the recording head is used as the ink jet recording head, a surface at which the ejection outlets 105 are formed is disposed so as to face a recording surface of a recording medium. The recording head causes energy generated by the energy generating elements 107 to act on ink filled on the flow passages through the supply port 108, thus ejecting ink droplets from the ejection outlets 105. Recording is effected by depositing these ink droplets on the recording medium. As the energy generating element, an electrothermal transducer or the like for thermal energy (so-called a heater) and a piezoelectric element or the like for mechanical energy may be used but the energy generating element is not limited to these elements.

(First Embodiment)

Hereinbelow, First Embodiment of the manufacturing method of an ink jet head (liquid ejection head) according to the present invention will be described with reference to schematic process sectional views of FIGS. 1(*a*) to 1(*j*). As a photosensitive resin material, a normal photoresist can be used.

First, on a substrate 1 on which a recording element 20 is formed, a negative photosensitive resin material layer 2 is formed (FIG. 1(*a*)). As a material for the substrate 1, single-crystal silicon, glass, ceramics, metal, or the like can be used. Of these, single-crystal silicon is a most preferable material from the viewpoint of formation and processing property of the recording element. As the recording element, an electrothermal transducer, a piezoelectric element, or the like such as a heater or a heat-generating resistor is used but the recording element is not limited to these elements. In the case where the electrothermal transducer is used as the recording element, a protecting film (not shown) is formed at a surface of the electrothermal transducer for the purpose of impact relaxation during bubble generation, alleviation of damage from the ink, and the like.

As the negative photosensitive resin material used, it is possible to use those utilizing cationic polymerization, radical polymerization, and the like but the negative photosensitive resin material is not limited to these resin materials. When the negative photosensitive resin material utilizing a cationic polymerization reaction is taken as an example, cations generated from a photo-cation polymerization initiator contained in the negative photosensitive resin material promote polymerization or crosslinking between molecules of cationically polymerizable monomers or polymer to cure the negative photosensitive resin material.

As the photo-cation polymerization initiator, it is possible to use aromatic iodonium salts, aromatic sulfonium salts, and the like. Specifically, e.g., photo-cation polymerization initiators ("ADEKA OPTOMER SP-170", "ADEKA OPTOMER SP-150" (trade name)) are commercially available from ADEKA CORPORATION.

Such a negative photosensitive resin material is formed on the substrate 1 in the negative photosensitive resin material layer by a method such as a spin coating method, a direct coating method, or a lamination transfer method.

Next, the thus formed first negative photosensitive resin layer 2 is subjected to light exposure and development in a predetermined area to form a first flow passage wall 2-1 for forming a first bubble-generating chamber/flow passage (FIG. 1(*b*)). In this step, a portion to be formed as the first bubble-generating chamber and the flow passage is light-blocked and an area other than the portion is irradiated with light to cure the negative photosensitive resin material in the light-irradiation area, thus forming a cured resin material layer. As developing liquid, it is possible to use methyl isobutyl ketone, a mixture solvent of methyl isobutyl ketone/xylene, and the like.

Incidentally, in this embodiment and also in the following Embodiments, in the case of the negative photosensitive resin material, the negative photosensitive resin material in the light-irradiation area is cured to form a cured resin material film (layer).

Next, on the above-formed first flow passage wall 2-1, a soluble resin material layer 3 is formed (FIG. 1(*c*)). The soluble resin material layer 3 is required to have a film thickness sufficiently larger than a height of the first flow passage wall 2-1. As a forming method of the soluble resin material layer 3, it is possible to use the spin coating method, the direct coating method, and the lamination transfer method but the forming method is not limited to these methods. As a material for the soluble resin material layer 3, a photo-degradable positive photosensitive resin material may preferably be used. For example, a photosensitive resin material having a photosensitive wavelength range in the neighborhood of 290 nm, such as polymethyl isopropenyl ketone (PMIPK) or polyvinyl ketone or a photosensitive resin material having the photosensitive wavelength range in the neighborhood of 250 nm, such as a polymeric compound constituted by a methacrylate unit (e.g., polymethyl methacrylate (PMMA)) may be used but the material for the soluble resin material layer 3 is not limited to these materials.

Next, by abrading the formed soluble resin material layer 3, a flattened surface is formed so that the soluble resin material layer 3 is flattened in an area surrounded by the ink flow passage wall 2-1 (FIG. 1(*d*)).

As an abrading method, it is possible to use a CMP (chemical mechanical polish) technique, which is a chemical mechanical polishing method, by using slurry. In this case, the first flow passage wall 2-1 formed of the negative photosensitive resin material is sufficiently cross-linked by light exposure, thus providing a difference in hardness from the coated soluble resin material layer to sufficiently function as a polishing (abrasion) stop layer. As a result, it is possible to stably remove the soluble resin material layer by the abrasion until an upper pattern of the negative photosensitive resin material layer is exposed, so that the surface of the first flow passage wall 2-1 and the surface of the first positive photosensitive resin material layer 3 coincide with each other. Thus, the first flow passage wall 2-1 and the soluble resin material layer 3 have the substantially same height from the substrate 1.

As another method of flattening the soluble resin material layer 3 and the first flow passage wall 2-1, it is possible to use dry etching. Further, as particles for the abrasion, it is possible to use those of alumina, silica, and the like.

Separately, on a supporting substrate 6, a negative photosensitive resin material layer 4 as a layer formed of a curable resin material is formed and thereafter against the negative photosensitive resin material layer 4, a mold for transferring a flow passage wall 4 and an ejection outlet pattern 5 for providing a second bubble-generating chamber and a flow passage therefor is pressed (FIG. 1(*e*)). Then, the negative photosensitive resin material layer 4 is irradiated with light to be cured, so that a pattern for providing a second flow passage 4' and an ejection outlet 5 is transferred onto the negative photosensitive resin material layer 4 by separating the mold from the negative photosensitive resin material layer 4 (FIG. 1(*f*)). The transfer can be carried out by using a nanoimprint method. The ejection outlet 5 may preferably have a diameter of 15 μm or less and the second flow passage 4' may preferably have a diameter, larger than that of the ejection outlet 5, of 20 μm or more.

As the supporting substrate 6, it is possible to use quartz glass, single crystal silicon substrate, and the like.

Next, the substrate 1 and the supporting substrate 6 are disposed so that the negative photosensitive resin material layer 4 and the soluble resin material layer 3 are located opposite to each other (FIG. 1(*g*)). Thereafter, the negative photosensitive resin material layer 4 is pressed against the soluble resin material layer 3, so that the pattern of the second flow passage 4' and the ejection outlet 5 provided to the negative photosensitive resin material layer 4 on the supporting substrate 6 is transferred onto the flattened substrate of the first flow passage wall 2-1 and the soluble resin material layer 3 (FIG. 1(*h*)). The second flow passage 4' is provided so as to be located on the soluble resin material layer 3.

In this case, a condition including a transfer temperature, a transfer pressure, and a transfer time can be selected relatively freely since the lower layer is flattened but it is necessary to consider that both of the upper and lower layers caused no mutual dissolution and that the second flow passage wall 4 has sufficient adhesiveness to the previously formed first flow passage wall 2 of the negative photosensitive resin material. As a method of improving the adhesiveness, an adhesive layer of an adhesive may be formed between the upper and the lower layers or the ink flow passage wall 4 may be irradiated with light after the transfer.

Then, the supporting substrate 6 is separated (FIG. 1(*i*)). In this case, in order to facilitate the separation between the supporting substrate 6 and the negative photosensitive resin material layer 4, a release layer may be provided between the supporting substrate 6 and the negative photosensitive resin material layer 4 or the surface of the supporting substrate may be subjected to water-repellent treatment.

Then, the ink supply port (not shown) which penetrates through the substrate 1 is formed (not shown). As a method of forming the ink supply port, anisotropic etching or dry etching is generally used but the method is not limited to these etching methods. As an example thereof, an anisotropic etching method using a silicon substrate having a particular crystal orientation will be described. First, at a back surface of the silicon (Si) substrate 1, an etching mask is formed in an entire area while leaving only a slit portion having a size of the ink supply port. Then, the substrate 1 is dipped into an alkaline etching liquid consisting of an aqueous solution of potassium hydroxide, sodium hydroxide, tetramethylammonium hydroxide, or the like while being warmed. As a result, only a portion exposed at the slit portion of the substrate 1 can be dissolved with anisotropy, so that the ink supply port can be formed. Next, the etching mask is removed as desired. Incidentally, in this case, for the purpose of protecting the negative photosensitive resin layer and the ink-repellent layer at the surface of the substrate from the etching liquid, a layer of resin material or the like having resistance to the etching liquid may be formed on the surface of the substrate as a protection layer.

Therefore, the soluble resin material layer 3 for forming a first ink flow passage pattern is dissolved and removed by using a removing liquid to form a first flow passage 3' communicating with the ink ejection outlet (FIG. 1(*j*)).

As the removing liquid, methyl isobutyl ketone (MIBK) or the like can be used.

In the case of using the positive photosensitive resin material for the soluble resin material layer, dissolubility of the resin material in the removing liquid is improved by irradiating the soluble resin material layer 3 for forming the flow passage pattern with ionizing radiation (light exposure) to cause decomposition reaction of the positive photosensitive resin material. In order to further improve the dissolubility, application of ultrasonic wave or temperature rise of the removing liquid is also effective. In this case, as the removing liquid, it is also possible to use MIBK.

(Second Embodiment)

Second Embodiment of the manufacturing method of an ink jet head according to the present invention will be described with reference to schematic process sectional views of FIGS. 2(*a*) to 2(*j*).

In the manufacturing method of the ink jet head in this embodiment, a photosensitive resin material layer, on which a latent image for a second flow passage wall and an ejection outlet pattern is formed, formed on a supporting substrate is transferred.

Figure 2:
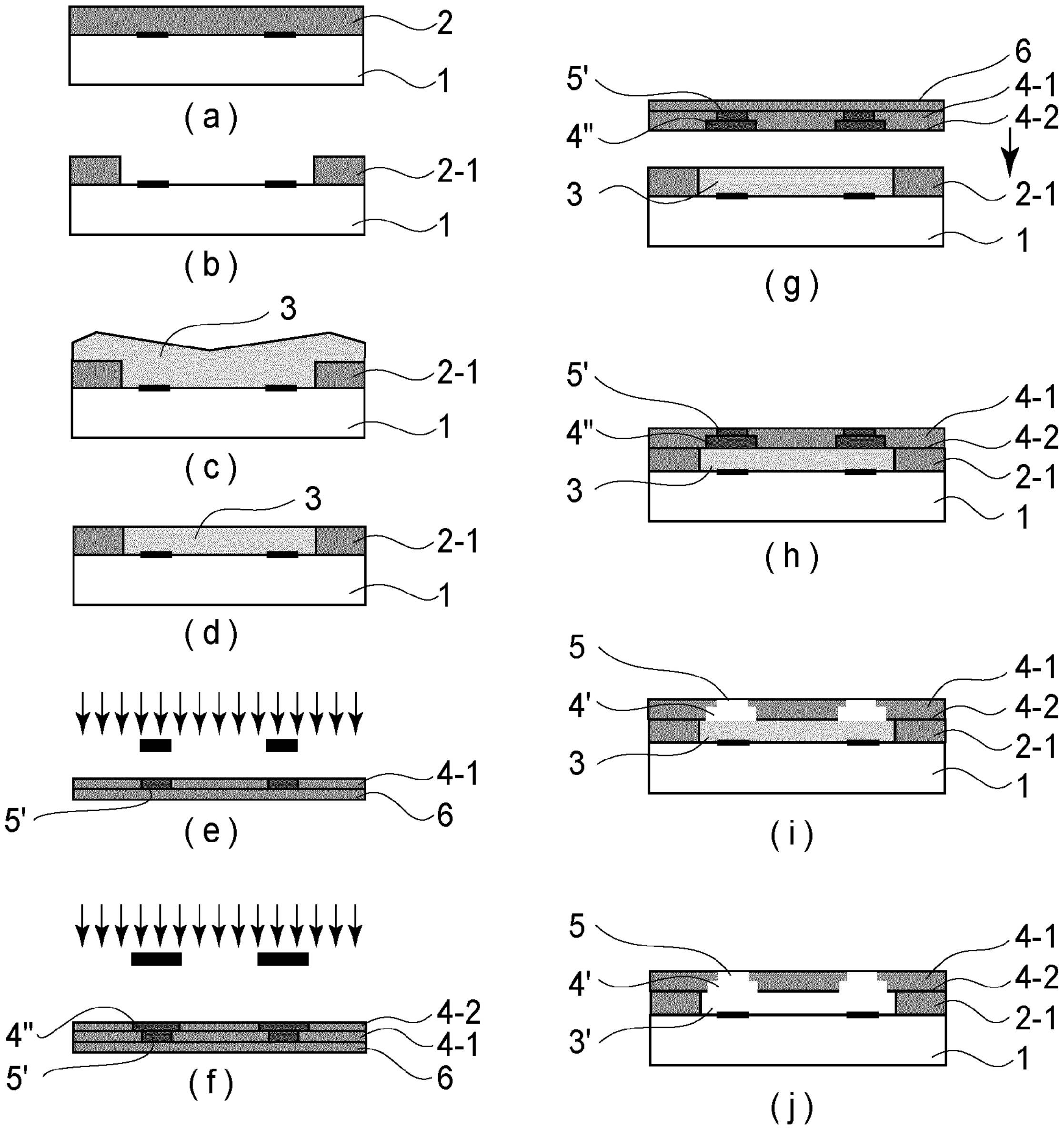
FIGS. 2(*a*) to 2(*j*) are schematic sectional views for illustrating another embodiment of the manufacturing method of a liquid ejection head according to the present invention.

Manufacturing steps, shown in FIGS. 2(*a*) to 2(*d*), until the first ink flow passage wall and the sacrifice layer are formed to have a flattened surface are the same as those in First Embodiment shown in FIGS. 1(*a*) to 1(*d*), thus being omitted from detailed explanation.

On a supporting substrate 6, a first negative photosensitive resin material layer 4-1 is formed and is subjected to light exposure through a mask having an ejection outlet pattern shape to form a latent image 5' for an ejection outlet (FIG. 2(*e*)). Then, on the first negative photosensitive resin material layer 4, a second negative photosensitive resin material layer 4-2 is formed and exposed to light to form a latent image 4', a second flow passage constituting a second bubble generating chamber and an ink flow passage wall (FIG. 2(*f*)). A dimension of the latent image 5' for the ejection outlet provided to the first negative photosensitive resin material layer 4-1 as a lower layer is smaller than that of the latent image 4" for the second flow passage provided to the second negative photosensitive resin material layer 4-2 as an upper layer. For this reason, negative photosensitive resin materials to be exposed to light in the same wavelength can be used for the first negative photosensitive resin material layer 4-1 and the second negative photosensitive resin material layer 4-2. That is, a portion at which the second negative photosensitive resin material layer 4-2 as the upper layer is exposed to light is within an area of a portion at which the first negative photosensitive resin material layer 4-1 as the lower layer is exposed to light. As a result, an unexposed portion of the lower layer 4-1 located under the upper layer 4-2 is not subjected to light exposure, so that there is no possibility that the lower layer 4-1 is adversely affected by the light exposure with respect to the upper layer 4-2.

In this embodiment, a step of separately applying the first negative photosensitive resin material layer 4-1 for forming an orifice plate having the ejection outlet and the second negative photosensitive resin material layer 4-2 for forming a second flow passage 4' is described but it is also possible to employ such a method that these layers are simultaneously formed in a thickness corresponding to the total thickness of the above layers 4-1 and 4-2 and then are subjected to light exposure through photomasks having different absorbances.

Next, the first and second negative photosensitive resin material layers 4-1 and 4-2 on which the latent images are formed, and the flattened first bubble-generating chamber and soluble resin material layer are disposed opposite to each other (FIG. 2(*g*)). Then, the first and second negative photosensitive resin material layers 4-1 and 4-2 are applied to the flattened first flow passage wall 2-1 and soluble resin material layer 3 and thereafter the supporting substrate 6 is removed (FIG. 2(*h*)).

Thereafter, the latent images which are non-exposed patterns are removed (FIG. 2(*i*)) and then the soluble resin material layer 3 is removed by the same method as that in the step of FIG. 1(*j*) (FIG. 2(*j*)).

In this case, it is also possible to select a developing liquid capable of removing the latent image patterns and the soluble resin material layer 3 at the same time. As the developing liquid, an organic developing liquid, e.g., MIBK or the like, can be used.

(Third Embodiment)

Third Embodiment of the manufacturing method of the ink jet head according to the present invention will be described with reference to schematic process sectional views of FIGS. 3(*a*) to 3(*j*).

Figure 3:
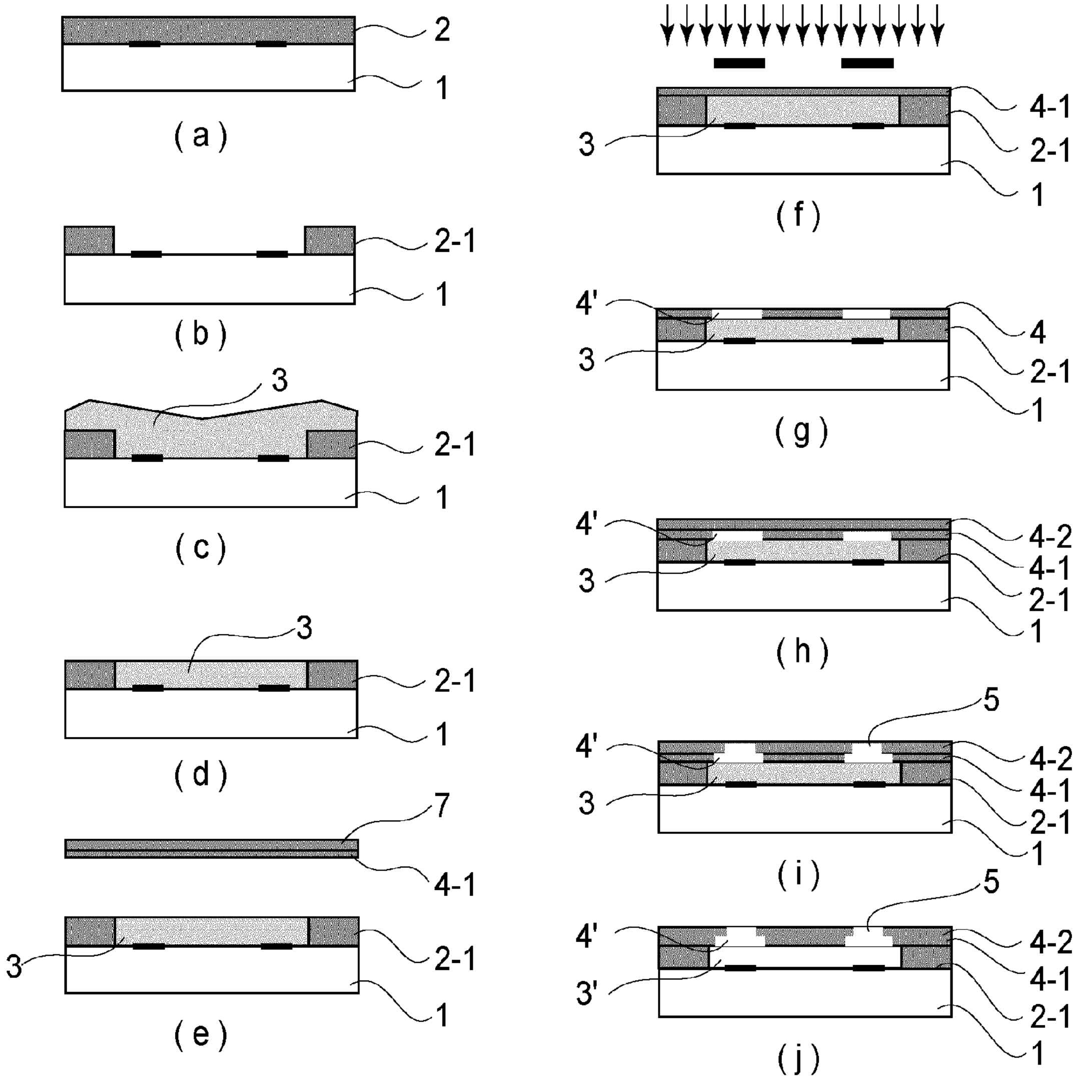
FIGS. 3(*a*) to 3(*j*) are schematic sectional views for illustrating another embodiment of the manufacturing method of a liquid ejection head according to the present invention.
Figure 4:
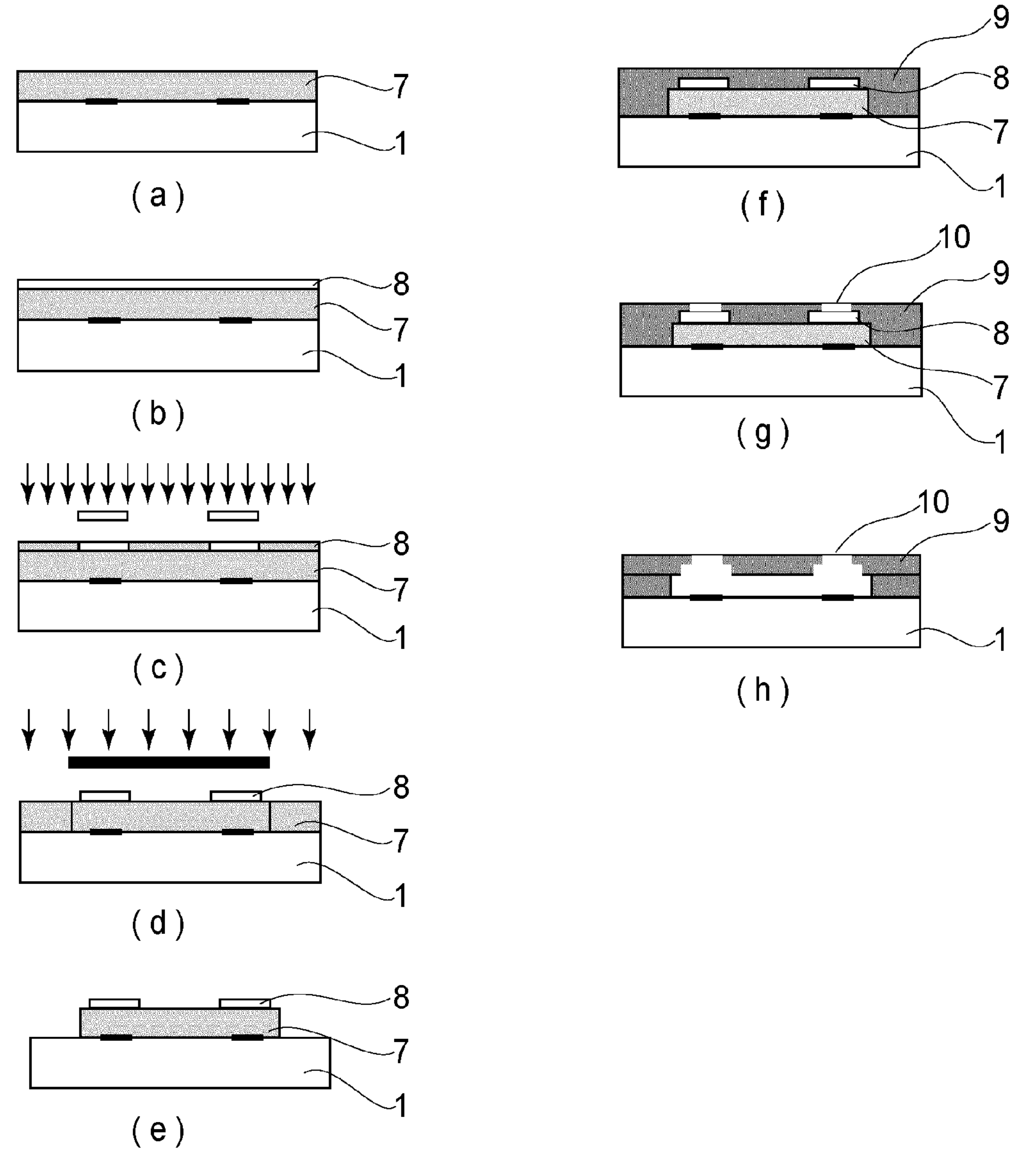
FIGS. 4(*a*) to 4(*h*) are schematic sectional views for illustrating an embodiment of a conventional ink jet head manufacturing method.

Manufacturing steps, shown in FIGS. 3(*a*) to 3(*d*), until the ink flow passage wall and the soluble resin material layer are flattened are the same as those in First Embodiment shown in FIGS. 1(*a*) to 1(*d*), thus being omitted from detailed explanation.

A dry film resist including a base film 7 and a first negative photosensitive resin material layer 4-1 formed on the base film 7 in a predetermined thickness is disposed so as to oppose a first flow passage wall 2-1 and a soluble resin material layer 3 (FIG. 3(*e*)). Thereafter, the first negative photosensitive resin material layer 4-1 is pressed against the first flow passage wall 2-1 and the soluble resin material layer 3 to be provided on the first flow passage wall 2-1 and the soluble resin material layer 3 which have been flattened.

A condition including a transfer temperature, a transfer pressure, and a transfer time can be selected relatively freely since the lower layer is flattened but it is necessary to consider that no mutual dissolution with the sacrifice layer occurs and that the second flow passage wall 4 has sufficient adhesiveness to the previously formed first flow passage wall 2 of the negative photosensitive resin material. Further, in order to facilitate the transfer of the first negative photosensitive resin material layer 4-1 from the base film, fluorine-imparting treatment for the base film is also effective.

Then, the first negative photosensitive resin material layer 4-1 is subjected to light exposure through lithography (FIG. 3(*f*)), so that a second flow passage wall 4 for constituting a second bubble-generating chamber and an ink flow passage therefor is formed in the first negative photosensitive resin material layer 4-1 (FIG. 3(*g*)).

When the negative photosensitive resin material is selected, by using the negative photosensitive resin material having a sensitivity wavelength different from that of the soluble resin material layer 3, it is possible to effect patterning without causing decomposition reaction of the soluble resin material layer 3 even when the soluble resin material layer 3 is exposed to light. Further, the developing liquid is required to be selected so as not to adversely affect the lower light. For this purpose, it is possible to use a mixture liquid such as a mixture of MIBK, xylene and isopropyl alcohol (IPA) or the like.

Then, by using a dry film resist including a second negative photosensitive resin material layer 4-2 constituting an orifice plate, the second negative photosensitive resin material layer 4-2 is transferred onto the first negative photosensitive resin material layer 4-1 (FIG. 3(*h*)).

A transfer condition is required to be selected so that collapse does not occur at a hollow portion of the ink flow passage. For example, by suppressing the transfer temperature and the transfer pressure at low levels, it is possible to form a stable shape without adversely affecting the ink flow passage and the shape of the orifice plate.

Then, an ejection outlet 5 is provided to the second negative photosensitive resin material layer 4-2 by light exposure and development (FIG. 3(*i*)). For patterning of the ejection outlet 5, a mask is used in which light is blocked at a portion constituting the ink ejection outlet 5 and in an area other than the portion constituting the ink ejection outlet 5, light exposure is permitted.

Then, by employing the same step as that of FIG. 1(*j*), a liquid ejection head is manufactured (FIG. 3(*j*)).

EXAMPLE 1

In this example, a liquid ejection head was prepared by using the manufacturing method of First Embodiment.

First, a single-crystal silicon substrate 1 on which a recording element, a driver circuit, and a logic circuit were formed was prepared. On the substrate 1, a negative photosensitive resin material layer 2 was formed.

As a negative photosensitive resin material for forming the negative photosensitive resin material layer 2, a photosensitive resin material solution having the following composition (1) was used.

(Composition (1))

| | |
|---|---|
| EHPE-3150 (trade name, mfd. by DAICEL CHEMICAL INDUSTRIES, LTD.) | 100 wt. parts |
| HFAB (trade name, by Central Glass Co., Ltd.) | 20 wt. parts |
| A-187 (trade name, mfd. by Nippon Unicar Co., Ltd.) | 5 wt. parts |
| SP172 (trade name, mfd. by ADEKA CORPORATION) | 6 wt. parts |
| Xylene | 80 wt. parts |

Onto the substrate 1, the above-constituted negative photosensitive resin material solution was applied by spin coating and then was pre-baked on a hot plate at 90° C. for 3 minutes, thus forming a 11 μm-thick negative photosensitive resin material layer 2 (FIG. 1(*a*)).

Next, the negative photosensitive resin material layer was subjected to pattern exposure at an exposure amount of 500 mJ/cm$^2$ through a mask provided with a pattern of an ink flow passage wall by using a mask aligner ("MPA 600 Super" (trade name), mfd. by Canon Kabushiki Kaisha). Then, the negative photosensitive resin material layer 2 was subjected to PEB (post etching bake) at 90° C. for 180 sec, development using a mixture solution of methyl isobutyl ketone/xylene =2/3, and rinsing with xylene to form a first ink flow passage wall 2-1 (FIG. 1(*b*)).

Next, this ink flow passage wall was coated with a soluble resin material layer 3 of a photodegradable positive photosensitive resin material.

As the photodegradable positive photosensitive resin material for forming a positive photosensitive resin material layer, polymethyl isopropenyl ketone ("ODUR-1010", mfd. by TOKYO OHKA KOGYO CO., LTD.) was used. Specifically, the resin material was adjusted to provide a resin material concentration of 20 wt. % and was applied by spin coating. Thereafter, the resin material was subjected to pre-baking on a hot plate at 120° C. for 3 minutes to form a 18 μm-thick soluble resin material layer 3 (FIG. 1(*c*)).

Next, the soluble resin material layer 3 was abraded by using the CMP method until the surface of the negative photosensitive resin material layer 2-1 is exposed (FIG. 1(*d*)).

Separately, on a supporting layer 6, a negative photosensitive resin material layer 4 having the above-described composition (1) was applied in a thickness of 10 μm through a release layer (FIG. 1(*e*)). Then, a quartz-made mold having a projected shape corresponding to a shape of a second flow passage and an ejection outlet was subjected to fluorine-imparting treatment and thereafter was pressed against the negative photosensitive resin material layer 4, followed by light exposure from the supporting substrate 6 side to cure the negative photosensitive resin material. Thereafter, the quartz-made mold was separated from the negative photosensitive resin material layer 4 (FIG. 1(*f*)).

Then, the negative photosensitive resin material layer 4 provided with a second flow passage 4' and an ejection outlet 5 and the first ink flow passage wall 2-1 and the soluble resin material layer 3 which were flattened were disposed opposite to each other (FIG. 1(*g*)). At this time, these members are required to be positionally aligned so that the ejection outlet 5 and the recording element 20 formed on the substrate 1 are located opposite to each other.

This positional alignment can be performed by using an alignment pattern formed on the substrate 1 or the negative photosensitive resin material layer 2 formed on the substrate 1 and an alignment pattern formed on the supporting substrate 6 or the negative photosensitive resin material layer 4 in combination.

In this embodiment, the patterns formed on the substrate 1 and the supporting substrate 6 were used to perform the positional alignments.

Thereafter, the negative photosensitive resin material layer 4 which was formed on the supporting substrate 6 and was provided with the second flow passage 4' and the ejection outlet 5 was transferred onto the first flow passage wall 2-1 and the soluble resin material layer 3 which were flattened (FIG. 1(*h*)). In this case, between both the layers, a thin photocurable resin material layer as an adhesive layer was formed and exposed to light after the alignment to further enhance adhesiveness between the both layers.

Then, the supporting substrate 6 was removed (FIG. 1(*i*)).

Next, onto an entire surface at which the ejection outlet 5 was formed, a protecting layer of "OBC" (trade name, mfd. by TOKYO OHKA KOGYO CO., LTD.) was applied. Then, at a back surface of the substrate, a slit-like etching mask was formed of a polyetheramide resin material ("HIMAL" (trade name), mfd. by Hitachi Chemical Co., Ltd.) and the substrate was immersed in a tetramethylammonium hydroxide aqueous solution at 80° C., so that anisotropic etching was performed with respect to the silicon substrate to form the ink ejection outlet at the back surface of the substrate 1 (not shown). The etching mask may also be formed in advance of the preparation of the substrate.

Next, the material ("OBC") for the protecting layer was removed by xylene and thereafter the resultant structure was subjected to whole surface exposure at an exposure amount of 7000 mJ/cm$^2$ from the side where the ejection outlet was formed, so that the soluble resin material layer 3 for forming the ink flow passage pattern was solubilized. The structure was immersed in methyl lactate while applying thereto ultrasonic wave, thus removing the ink flow passage pattern to prepare an ink jet head as shown in FIG. 1(*j*).

EXAMPLE 2

In this example, an ink jet head was manufactured by using the manufacturing method of Second Embodiment. Manufacturing steps shown in FIGS. 2(*a*) to 2(*d*) were performed by employing the same process as that in Example 1, thus being omitted from explanation.

In this embodiment, on the supporting substrate 6, the negative photosensitive resin material having the composition (1) described above was applied by spin coating and then subjected to baking at 90° C. for 180 seconds to form a 5 μm-thick negative photosensitive resin material layer 4.

Thereafter, the negative photosensitive resin material layer 4 was exposed to light at an exposure amount of 500 mJ/cm$^2$ through a photo-mask provided with a pattern for the ejection outlet 5 by using the mask aligner ("MPA600 Super", mfd. by Canon Kabushiki Kaisha) to form a latent image 5" for the ejection outlet in the negative photosensitive resin material layer 4-1 (FIG. 2(*e*)). Thereafter, PEB at 90° C. for 180 seconds was performed.

Further, on the negative photosensitive resin material layer 4-1, the negative photosensitive resin material having the above-described composition (1) was formed by spin coating, followed by baking at 90° C. for 180 seconds to form a 5 μm-thick negative photosensitive resin material layer 4-2.

Next, the pattern for the second bubble-generating chamber and the ink flow passage is exposed to light by using the mask aligner (MPA600 Super), followed by PEB at 90° C. for 180 seconds to form a latent image 4" for forming an ink flow passage wall 4 and an ink flow passage 4' (FIG. 2(*f*)).

Then, the negative photosensitive resin material provided with the latent image on the supporting substrate was positionally aligned with the first flow passage wall and the soluble resin material layer which are flattened. After both the members were brought into close contact with each other, the resultant structure was subjected to light exposure and then PEB at 90° C. for 180 seconds to transfer the pattern (FIG. 2(*g*)). Thereafter, the supporting substrate 6 was removed (FIG. 2(*h*)).

The positional alignment was performed by using the alignment patterns similarly as in Embodiment 1.

Further, in the same manner as in Embodiment 1, after the ink ejection outlet was formed on the substrate by wet etching, development of the latent image pattern of the negative photosensitive resin material layer was performed by using a mixture solution of MIBK/xylene (FIG. 2(*i*)).

Finally, by using methyl lactate, the soluble resin material layer 3 was removed to prepare an ink jet head as shown in FIG. 2(*j*).

EXAMPLE 3

In this example, an ink jet head was manufactured by using the manufacturing method of Third Embodiment. Manufacturing steps shown in FIGS. 3(*a*) to 3(*d*) were performed by employing the same process as that in Example 1, thus being omitted from explanation.

Onto the abraded surface of the soluble resin material layer 3, a 6 μm-thick negative photosensitive resin material was transferred from a dry film resist including the negative photosensitive resin material to form a negative photosensitive resin material layer 4-1 (FIG. 3(*e*)). In this step, a transfer condition including a transfer temperature of 60° C., a transfer pressure of 1 kgf/m2, and a transfer time of one minute was employed.

Then, the negative photosensitive resin material layer 4-1 was subjected to pattern exposure at an exposure amount of 300 mJ/cm$^2$ through a mask provided with a pattern for a bubble-generating chamber and an ink flow passage by using the mask aligner (MPA600 Super) (FIG. 3(*f*)). Then, PEB was performed at 90° C. for 180 seconds and development was performed by using a mixture solution of MIBK/xylene (=2/3), followed by rinse treatment to form an ink flow passage wall 4 and an ink flow passage 4' (FIG. 3(*g*)).

Next, onto the ink flow passage wall 4 and the ink flow passage 4', a 5 μm-thick negative photosensitive resin material having the above-described composition (1) was transferred from a dry film resist including the negative photosensitive resin material to form a negative photosensitive resin material layer 4-2 (FIG. 3(*h*)). In this step, a transfer condition including a transfer temperature of 40° C., a transfer pressure of 1 kgf/cm$^2$, and a transfer time of 1 minute was employed.

Then, the negative photosensitive resin material layer 4-2 was subjected to pattern exposure at an exposure amount of 300 mJ/cm$^2$ through a mask provided with a pattern for an ejection outlet by using the mask aligner (MPA600 Super). Then, PEB was performed at 90° C. for 180 seconds and development was performed by using a mixture solution of MIBK/xylene (=2/3), followed by rinse treatment to form an ejection outlet (FIG. 3(*i*)).

Next, by using the same manufacturing step as that in Embodiment 1, an ink jet head was prepared (FIG. 3(*j*)).

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 064139/2008 filed Mar. 13, 2008, which is hereby incorporated by reference.

What is claimed is:

1. A manufacturing method of a liquid ejection head including an ejection outlet forming member provided with an ejection outlet for ejecting liquid and including a flow passage communicating with the ejection outlet, said manufacturing method comprising:

preparing a substrate on which i) a first flow passage wall forming member having a shape defining a part of a wall of the flow passage and ii) a solid layer having a shape of a part of the flow passage contact each other, wherein the first flow passage wall forming member has a height, from a surface of the substrate, substantially equal to that of the solid layer;

providing a first layer formed of a negative photosensitive resin material;

exposing to light a portion of the first layer to form the ejection outlet forming member;

providing a second layer, on the first layer, formed of a negative photosensitive resin material;

exposing to light a portion of the second layer to form a second flow passage wall forming member for forming another part of the wall of the flow passage;

placing the exposed first layer and the exposed second layer on the solid layer and the first flow passage wall forming member so that a non-exposed portion of the second layer contacts the solid layer;

forming the other part of the flow passage and the ejection outlet by removing a non-exposed portion of the first layer and the non-exposed portion of the second layer above the substrate; and forming a remainder of the flow passage by removing the solid layer.

2. A method according to claim 1, wherein the exposed portion of the second layer is located inside the exposed portion of the first layer.

3. A method according to claim 1, wherein said step of preparing the substrate comprises:

providing the first flow passage wall forming member on the substrate;

forming the solid layer on the substrate so as to coat the first flow passage wall forming member; and exposing the first flow passage wall forming member by abrading the solid layer with respect to a direction toward the substrate.

* * * * *

UNITED STATES PATENT AND TRADEMARK OFFICE

CERTIFICATE OF CORRECTION

PATENT NO. : 8,191,260 B2
APPLICATION NO. : 12/400440
DATED : June 5, 2012
INVENTOR(S) : Kato et al.

It is certified that error appears in the above-identified patent and that said Letters Patent is hereby corrected as shown below:

Title Page, Item (73): “Canon Kabushiki Kaisha Kaisha” should read as --Canon Kabushiki Kaisha--.

Signed and Sealed this
Twentieth Day of November, 2012

David J. Kappos
*Director of the United States Patent and Trademark Office*